(12) United States Patent
Moran et al.

(10) Patent No.: US 10,430,064 B2
(45) Date of Patent: Oct. 1, 2019

(54) TECHNIQUES FOR UTILIZING TRANSLUCENT USER INTERFACE ELEMENTS

(71) Applicant: Amazon Technologies, Inc., Seattle, WA (US)

(72) Inventors: Kevin Moran, San Francisco, CA (US); Drew Bratcher, San Francisco, CA (US); Aaron Koop, San Francisco, CA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 15/882,219

(22) Filed: Jan. 29, 2018

(65) Prior Publication Data
US 2019/0235718 A1    Aug. 1, 2019

(51) Int. Cl.
| G06F 3/0485 | (2013.01) |
| G06F 3/0488 | (2013.01) |
| G06T 11/40 | (2006.01) |
| G06F 16/44 | (2019.01) |
| G06F 16/438 | (2019.01) |

(52) U.S. Cl.
CPC .......... *G06F 3/0485* (2013.01); *G06F 3/0488* (2013.01); *G06F 16/4387* (2019.01); *G06F 16/44* (2019.01); *G06T 11/40* (2013.01)

(58) Field of Classification Search
CPC .................................................. G06F 3/0485
USPC ........................................................ 715/784
See application file for complete search history.

(56) References Cited

U.S. PATENT DOCUMENTS

| 6,430,574 | B1 | 8/2002 | Stead | |
| 8,515,963 | B1* | 8/2013 | Blank, Jr. | G06F 3/04842 |
| | | | | 707/741 |
| 9,152,695 | B2* | 10/2015 | Tibrewal | G06F 16/285 |
| 10,021,459 | B2* | 7/2018 | Stein | H04N 21/4826 |

(Continued)

FOREIGN PATENT DOCUMENTS

WO    2015166315    11/2015

OTHER PUBLICATIONS

U.S. Appl. No. 29/637,197, filed Feb. 14, 2018, Titled: Ornamental Design for Translucent User Interface Elements.

(Continued)

*Primary Examiner* — William D Titcomb
(74) *Attorney, Agent, or Firm* — Kilpatrick Townsend & Stockton LLP

(57) ABSTRACT

Techniques are provided herein for implementing transparent user interface elements. In at least one embodiment, a user interface comprising a section header element and a section entry element associated with the section header element may be presented. The section header element may have a background that is transparent and the section entry element may be presented as being below the section header element. User input corresponding to a scroll action may be received. The section entry element may be scrolled upward within the user interface based at least in part on the user input. It may be determined that the scrolling causes the section entry element to traverse the section header element. As a result, the background of the section header element may be altered from transparent to translucent and the section entry element may appear as if behind the section header element.

20 Claims, 11 Drawing Sheets

(56) References Cited

U.S. PATENT DOCUMENTS

2015/0067556 A1\* 3/2015 Tibrewal ............... G06F 16/285
715/765
2015/0286357 A1 10/2015 Penha et al.
2015/0346919 A1 12/2015 Robbin et al.
2017/0105048 A1\* 4/2017 Stein .................. H04N 21/4826

OTHER PUBLICATIONS

PCT/US2019/015007, "International Search Report and Written Opinion", dated Jul. 18, 2019, 12 pages.

\* cited by examiner

TECHNIQUES FOR UTILIZING TRANSLUCENT USER INTERFACE ELEMENTS

BACKGROUND

Some user interfaces may provide various lists of information. By way of example, user interfaces for some music applications may display lists of songs, albums, and/or playlists. In some interfaces, list entries that are related may be grouped and labeled (e.g., with a section header label). Conventionally, as the user scrolls through a list, the label may be scrolled along with the list entries. In some cases, the label may be scrolled off the screen although some of the list entries may still be visible. This may make it difficult for the user to identify what list he is currently viewing.

BRIEF DESCRIPTION OF THE DRAWINGS

Various embodiments in accordance with the present disclosure will be described with reference to the drawings, in which.

DETAILED DESCRIPTION

Figure 1:
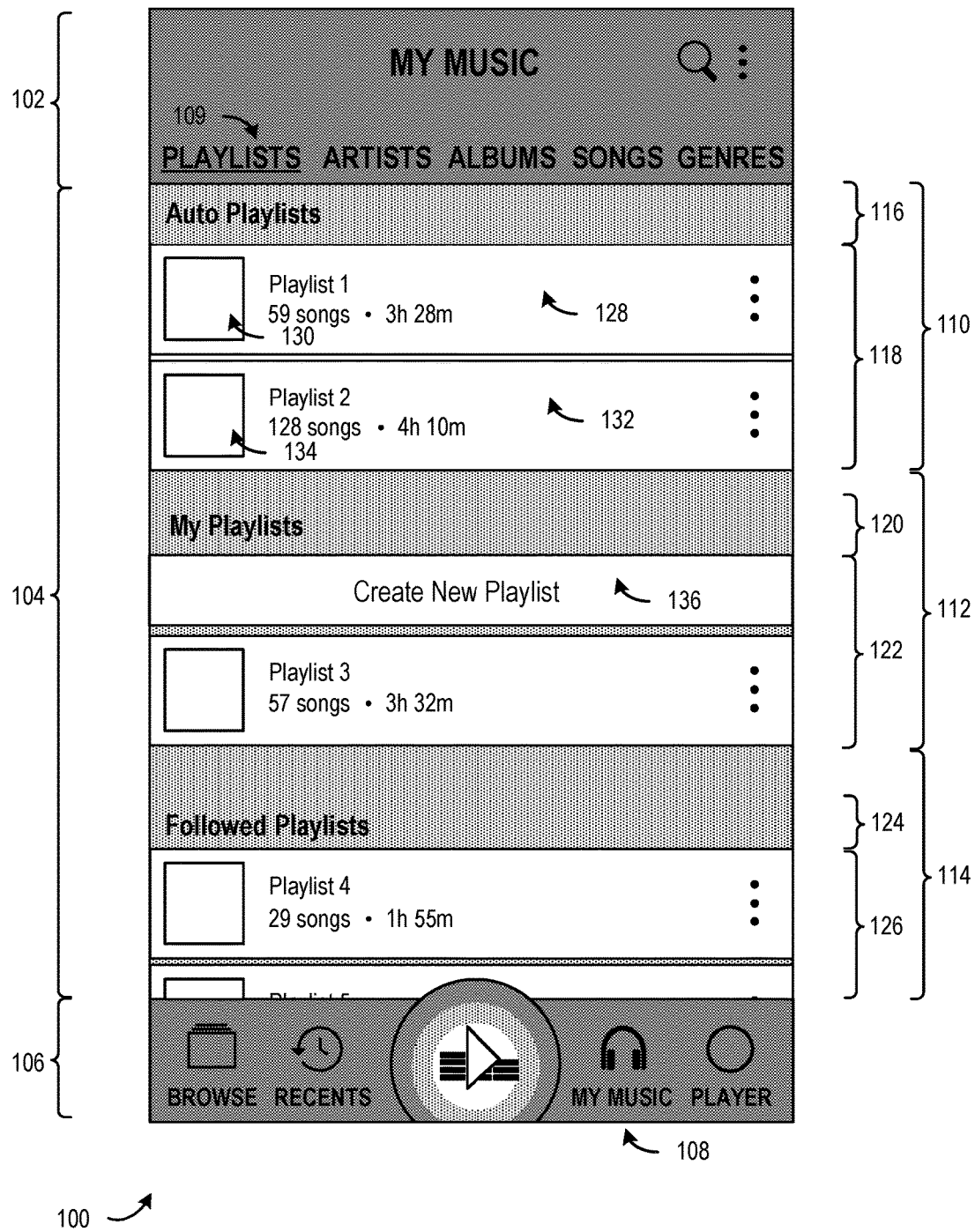
FIG. 1 is a schematic diagram illustrating a first example of a user interface for implementing aspects of a translucent user interface element, according to some embodiments.

Techniques described herein are directed to providing dynamically changing and/or utilizing translucent user interface elements. In some examples, user interface elements can be visual representations of data or items to be displayed in a user interface. In some examples, a user interface element may include a section header element and/or a section entry element corresponding to a section of the user interface (e.g., an area for presenting information in tabular and/or list format). Examples of section header elements include icons (e.g., a rectangular shape) text or images that identify a particular header (e.g., a category or the like) associated with some data. Similarly, examples of section entry elements include icons or images for individual entries that correspond to the header elements. In some embodiments, a user interface element (e.g., a section header element) may have a transparent or translucent background. An transparent background may allow objects or other elements of the user interface to be clearly visible through the transparent background (e.g., as if looking through glass). A user interface element having a translucent background may enable the user to visibly make out object(s) and/or user interface element(s) through the translucent background, but not as clearly as those object/elements would be if viewed through a transparent background. Objects/elements viewed through a transparent background may be detailed such that every detail of the object(s)/element(s) may be seen, or the object(s)/element(s) through a translucent background may be obscured to some degree. Although examples herein may utilize user interfaces of a music application, it should be appreciated that these examples may equally apply in other types of user interfaces and/or contexts.

As a non-limiting example, a user device (e.g., a mobile phone), may provide an application within which a user may browse for data. By way of example, a user may utilize a music application associated with a music service to view various playlist groups. The application may present one or more playlists that are related to one another and labeled according to their relation. For example, a user interface may include a section header element (e.g., associated with a name or label) that may appear at the top of a list of section entry elements. One example might include a section header element that provides a label "Auto Playlists." The section header element may be positioned above multiple section entry elements that each correspond to a specific playlist that has been automatically generated for the user. Initially, the section header element may be docked at the top of a particular area of the user interface (e.g., a viewing area). User input (e.g., a gesture such as a swipe, a select and drag of a scroll bar, etc.) may be received that causes the section entry elements to be scrolled upward within the user interface. As a top-most section entry passes into the section header element, a portion of the section header element (e.g., the background) may be changed from transparent to translucent. Once translucent, the section header element may appear to be overlaid on top of the top-most section entry element such that at least an outline and/or information of the top-most section entry element may be visible. In some embodiments, the top-most section entry element may appear to be behind the translucent section header element. Thus, the section header element information (e.g., label text) may be clearly visible at the same time as the information of the top-most section entry element (e.g., a name of the playlist, a running time of the playlist, a number of songs associated with the playlist, etc.). As the user continues to scroll within the group, the label may remain docked making it clear to the user what section he is currently viewing.

Continuing with the example above, the user's input (or subsequent user input) may cause the bottom-most section entry element to become aligned with the section header element. That is, the bottom-most boundary of the bottom-most section entry element may align with the bottom-most boundary of the section header element. Once aligned, both the section header element and the bottom-most section entry element may be scrolled together off of the viewing area of the user interface. A new section header element may then become the top-most section header element within the viewing area.

In some embodiments, when the new section header element meets the top of the user interface (e.g., the viewing area), the new section header element may be docked at that particular location. In response to the initial, or subsequent user input, a top-most section entry element that was previously presented below the section header element may traverse into the section header element space. Upon determining that the top-most section entry element has one or more section entry elements and at that at least one of those section entry elements has traversed into the section header element space, the background of the section header element may be changed from transparent to translucent and overlaid in a similar manner as discussed above. Accordingly, the top-most section entry element (or more of the section entry elements) may be visually presented as being behind the section header element such that the information of the section header element (e.g., a label such as "My Playlists") may be visible at the same time, and within the same area as the information presented by the section entry elements (e.g., a name of the playlist, a running time of the playlist, a number of songs associated with the playlist, etc.).

In some situations, user input may be received that causes the section header element(s) and section entry element(s) to be scrolled in a downward direction. Upon determining that the section header element has a number of section entry elements and that no section header entry elements are currently traversing the top-most section header element, presentation of the top-most section header element may be modified from a translucent background to a transparent background. As the section header/entry elements continue to be scrolled in the downward direction, the top-most section header element may be undocked from the top of the viewing area when the top-most section header element is to be scrolled over a threshold distance from the top of the viewing area.

If the scrolling action continues to scroll the section header/entry elements further downward (or additional user input is received that causes the section header/entry elements to be scrolled further down), the "Auto Playlist" section header element may become visible again and may once again be identified as the top-most section header element within the viewing area/user interface. At the same time, the bottom-most section entry element of the "Auto Playlist" section may once again become visible. Initially, the section header element may be presented with a translucent background and may be scrolled downward together with the bottom-most section entry element until the bottom of the section header element reaches a threshold distance from the top of the viewing area. In some embodiments, upon reaching the threshold distance the section header element may be docked once more and the section entry element(s) may continue to be scrolled downward. When the section entry elements no longer traverse into the section header element, the background of the section header element may be changed from translucent to transparent.

FIG. 1 is a schematic diagram illustrating a first example of a user interface for implementing aspects of a translucent user interface element, according to some embodiments. User interface 100 may be provided by an application operating on a user device. User interface 100 may include any suitable number of areas such as a view selection area 102, a viewing area 104, and a menu option area 106. In some embodiments, the view selection area 102 may include any suitable number of view selection options. In some embodiments, the menu option area 106 may include one or more options (e.g., "browse," "recents," "my music," "player," a play button element, etc.). In the example depicted in FIG. 1, the information depicted within viewing area 104 may be presented based on the user selecting the "my music" option 108 and the "playlists" option 109.

In at least one embodiment, the viewing area 104 may include various user interface elements with one or more sections. Section 110, section 112, and section 114 are used for illustrative purposes, although more or fewer sections may be utilized. Each section may include a section header element and one or more section entry elements. For example, section 110 may include section header element 116 (e.g., labeled "Auto Playlist") and two section entry elements (e.g., section entry element set 118, labeled "Playlist 1" and "Playlist 2"). Section 112 may include section header element 120 and a section entry element set (e.g., section entry element set 122). Section entry element set 122 may include a "create new playlist" section entry element (e.g., section entry element 128) that, upon selection, may provide an addition user interface for creating a new playlist to be associated with the corresponding ("My Playlist") section. Section entry elements set 122 may include an additional section entry element (e.g., section entry element 132). Section 114 may include section header element 124 (e.g., labeled "Following Playlists") and at least two section entry elements (e.g., section entry element set 126). It should be appreciated that section entry element set 126 may include additional section entry elements that are partially visible or not currently visible within the viewing area depicted in FIG. 1.

Figure 7:
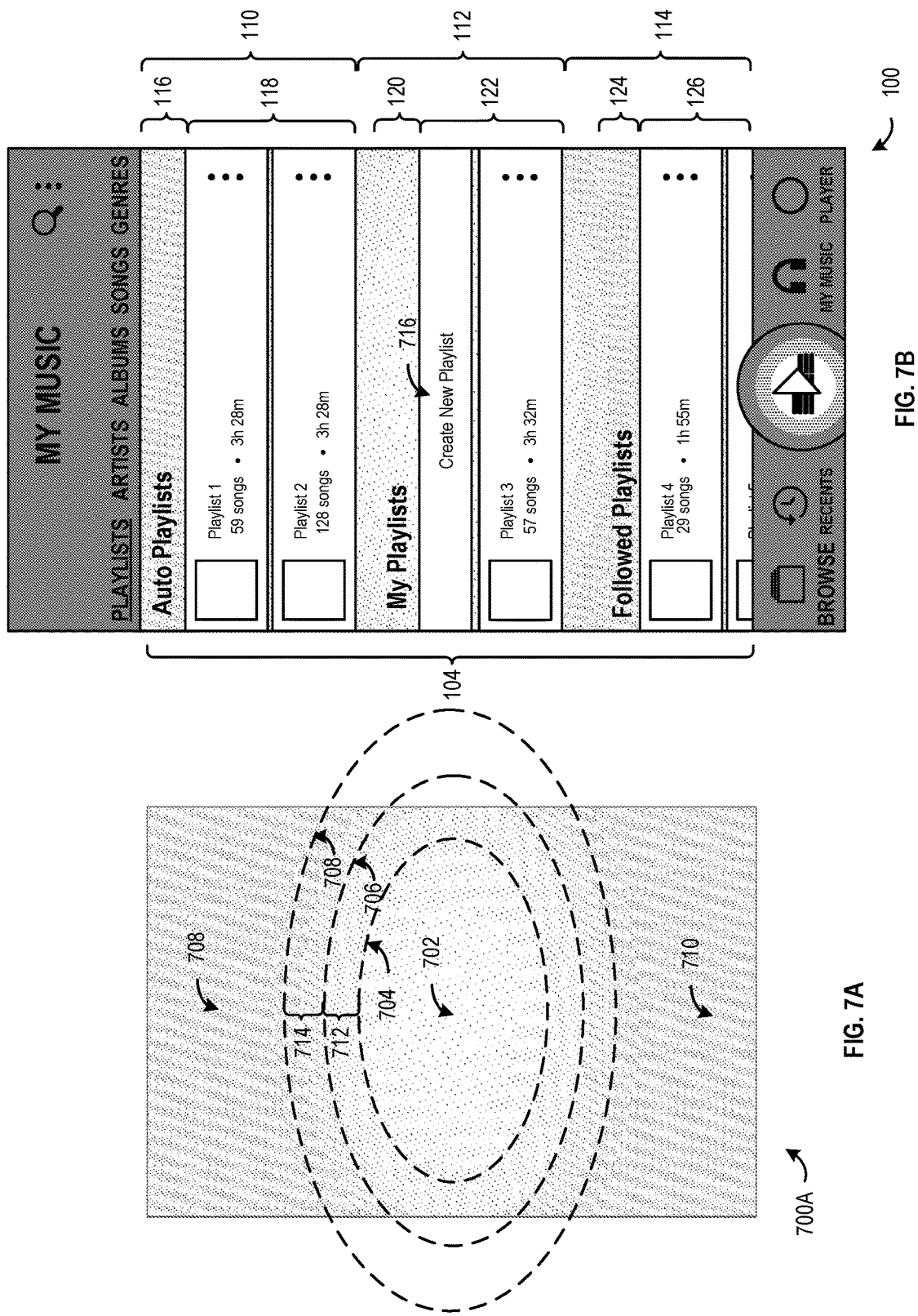
FIG. 7A is a schematic diagram illustrating of a gradient background of a user interface, according to some embodiments.
FIG. 7B is a schematic diagram illustrating the user interface of FIG. 1 as utilized with the gradient background of FIG. 7A, according to some embodiments.

In the example depicted in FIG. 1, the viewing area 104 may depict an initial view of a user interface prior to any user input (e.g., scroll actions). The section header element 116, the section header element 120, and the section header element 124 may be presented as having a transparent background. That is, these the background of the user interface may be viewed clearly through these section header elements. In some embodiments, the section header elements of FIG. 1 may appear in a manner consistent with a gradient background color. An example of a gradient background color will be discussed further below with respect to FIG. 7.

Each of the section entry elements depicted within FIG. 1 may be associated with section entry data (e.g., a name, a number of songs, a running time, a graphical icon, etc.). For example, section entry element 128 may be associated with section entry data including a name (e.g., Playlist 1), a number of songs (e.g., 59 songs), a running time (e.g., 3 hours and 28 minutes), and a graphical icon 130. One or more graphical icons of a section entry element (e.g., graphical icon 130) may be in any form. For example, the graphical icon 130 may be a collage of album covers corresponding to albums of the songs within playlist 1. Section entry element 132 may be associated with section entry data including a name (e.g., Playlist 2), a number of songs (e.g., 128 songs), a running time (e.g., 4 hours and 10 minutes), and a graphical icon 134 (e.g., a collage of album covers corresponding to albums of the songs within playlist 2).

In some examples, a section entry element may be associated with section entry data that includes a hyperlink. By way of example, the section entry element 136 may be associated with section entry data that includes a name (e.g., "Create New Playlist") and a hyperlink. Upon selecting section entry element 136 (e.g., through touch input, mouse click, or the like), the application may redirect the user to an additional user interface for creating a playlist.

Figure 2:
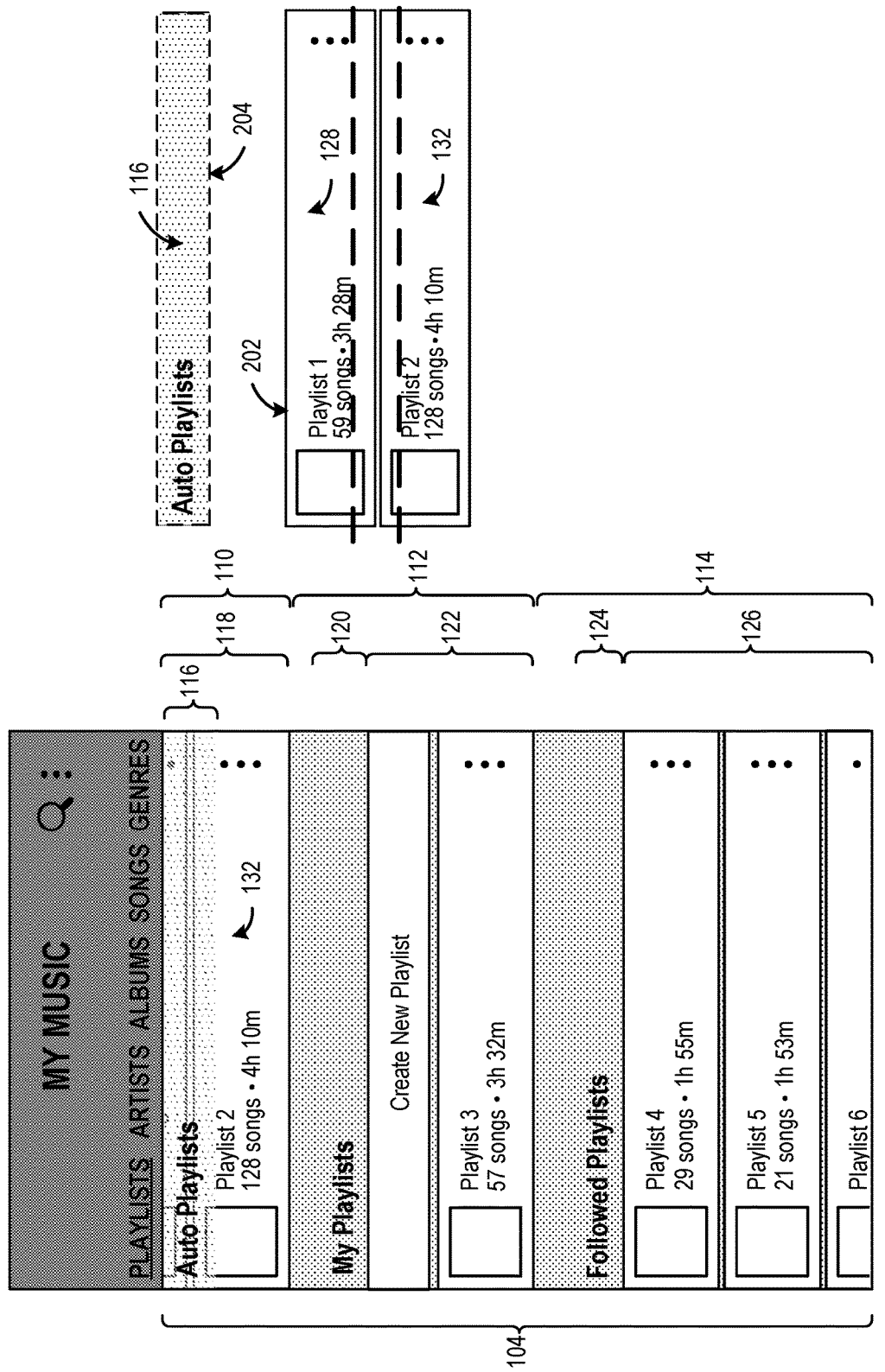
FIG. 2 is a schematic diagram illustrating a second example of a user interface for implementing aspects of a translucent user interface element, according to some embodiments.

FIG. 2 is a schematic diagram illustrating a second example of a user interface 200 for implementing aspects of a translucent user interface element (e.g., the section header element 116), according to some embodiments. User interface 200 may be provided by an application operating on a user device. User interface 200 may be an example of the user interface 100 after user input indicating a scroll action is received. For example, the user input may cause the user interface elements within the viewing area 104 to be scrolled upward.

In some embodiments, upon determining that the section header element 116 is visible within the viewing area 104, at least one section entry element is associated with the section header element 116, and that the section entry element 128 (or any section entry element associated with the section header element 116) has traversed into the section header element 116, the section header element 116 may be docked in the position depicted (e.g., at the top of the viewing area 104) and the background of section header element 116 may be changed from transparent to translucent. In some embodiments, the section entry element 128 may be determined to have traversed the section header element 116 when a top-most boundary 202 of the section entry element 128 meets and/or passes a bottom-most boundary 204 of the section header element 116. Once translucent, at least some portion of the section entry element 128 may be presented as if behind the section header element 116. In the example depicted in FIG. 2, as the scrolling action continues to cause the user interface elements within the viewing area 104 to be scrolled upward, the section header element 116 may continue to be overlaid over the section entry element set 118 (e.g., the section entry elements 128 and/or 132).

While the section header element 116 is docked, the remaining section header elements (e.g., the section header element 120 and the section header element 124) may be scrolled with the various section entry elements within the viewing area 104. While the section header element 116 has a translucent background, the backgrounds of the section header element 120 and the section header element 124 may continue to appear transparent.

In some embodiments, additional user input may be received that causes the user interface elements within the viewing area to be scrolled downward. When the section entry element 128 is scrolled far enough so that it no longer traverses the section header element 116, the background of the section header element 116 may be changed from translucent to transparent.

Figure 3:
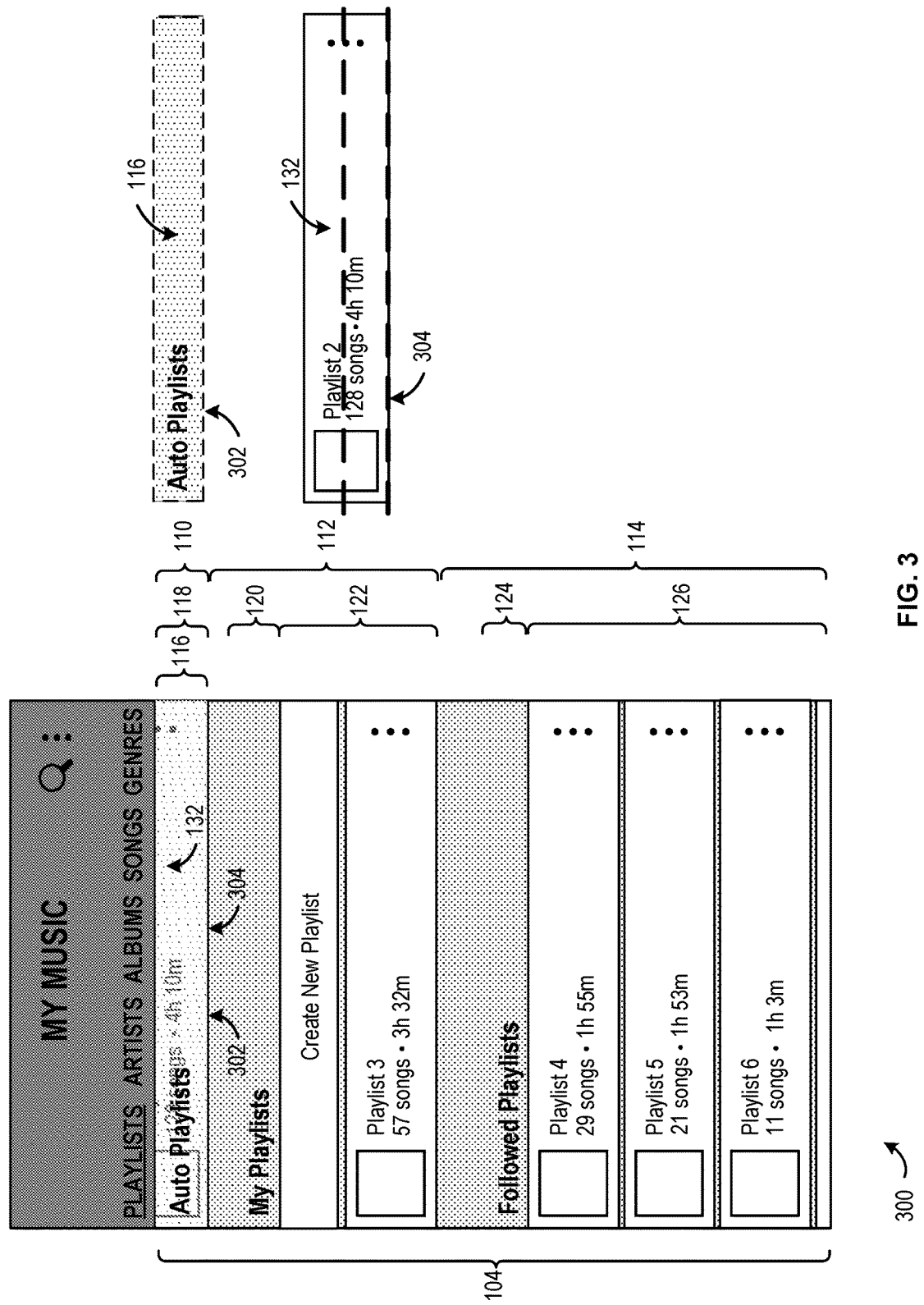
FIG. 3 is a schematic diagram illustrating a third example of a user interface for implementing aspects of a translucent user interface element, according to some embodiments.

FIG. 3 is a schematic diagram illustrating a third example of a user interface 300 for implementing aspects of a translucent user interface element (e.g., the section header element 116), according to some embodiments. User interface 300 may be provided by an application operating on a user device. User interface 300 may be an example of the user interface 200 depicted in FIG. 2 as the user interface elements within viewing area 104 have continued to be scrolled upward.

Figure 4:
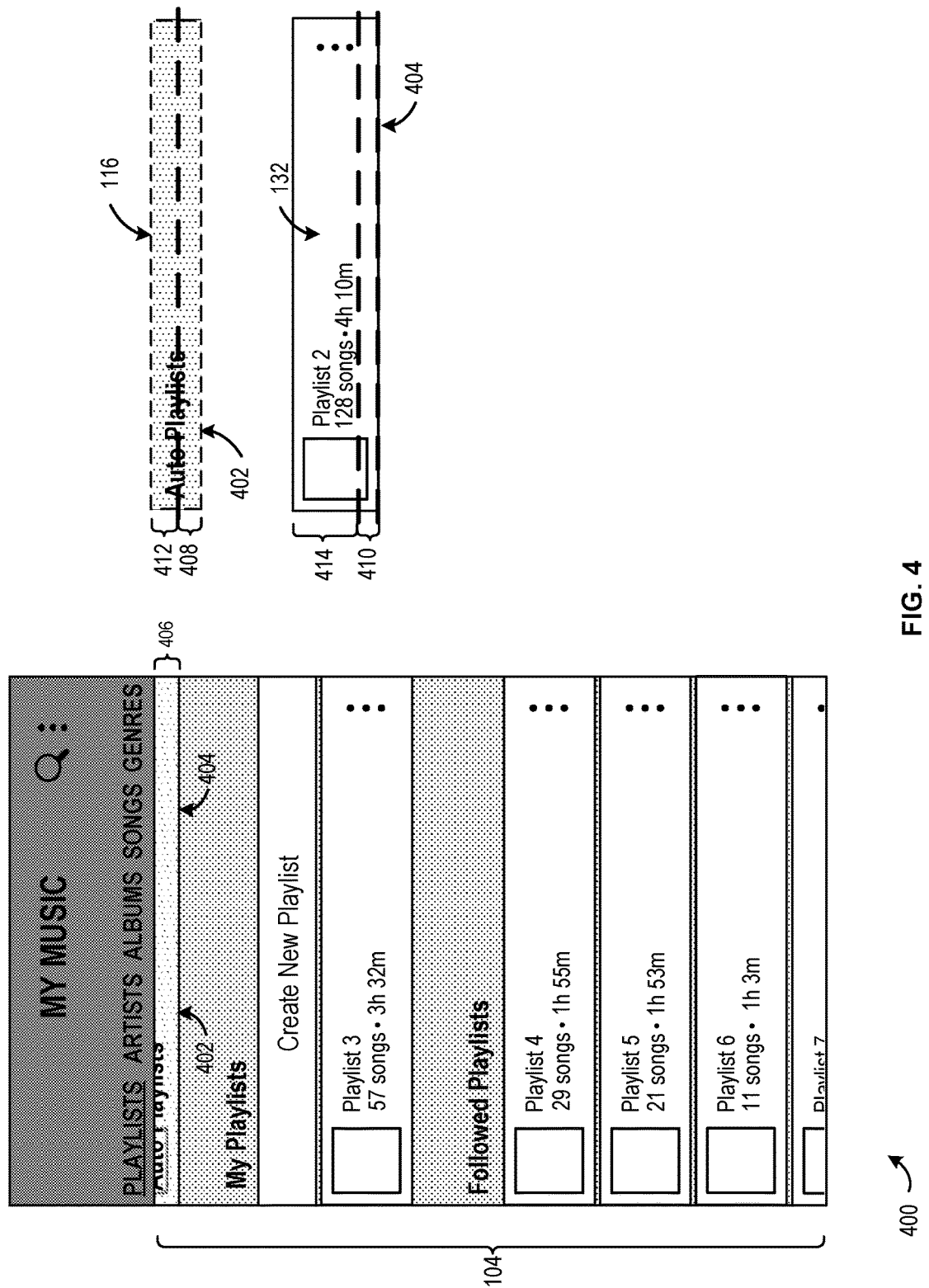
FIG. 4 is a schematic diagram illustrating a fourth example of a user interface for implementing aspects of a translucent user interface element, according to some embodiments.

In some embodiments, when the bottom-most boundary 302 of the section header element 116 aligns with the bottom-most boundary 304 of the section entry element 132, the section header element 116 may be undocked from the top of the viewing area 104. The section header element 116 may then be scrolled together with the section entry element 132 upward (as depicted in FIG. 4). The section header element 116 and the section entry element 132 may be scrolled such that they are no longer visible in the viewing area 104.

While the section header element 116 is viewable, the remaining section header elements (e.g., the section header element 120 and the section header element 124) may be scrolled with corresponding section entry element sets (e.g., the section entry element set 122 and section entry element set 126) within the viewing area 104. While the section header element 116 has a translucent background, the backgrounds of the section header element 120 and the section header element 124 may continue to appear transparent and/or may continue to appear in a manner consistent with a gradient background color (e.g., the gradient background 700A of FIG. 7A discussed below).

FIG. 4 is a schematic diagram illustrating a fourth example of a user interface 400 for implementing aspects of a translucent user interface element, according to some embodiments. User interface 400 may be provided by an application operating on a user device. User interface 400 may be an example of the user interface 300 of FIG. 3 as the user interface elements within viewing area 104 have continued to be scrolled upward.

The user interface elements within the viewing area 104 are scrolled upward, section header element 116 and the bottom-most section entry (e.g., section entry element 132) of the section entry element set 118 of FIG. 1 may maintain alignment. That is the bottom boundary 402 of the section header element 116 and the bottom boundary 404 of the section entry element 132 may remain aligned. Area 406 is intended to depict the portion 408 of the section header element 116 as overlaid over the portion 410 of the section entry element 132. Portion 412 of the section header element 116 and portion 414 of the section entry element 132 may not currently be visible within the viewing area 104 due to scrolling of the user interface elements upward in response to the previously-received user input.

Figure 5:
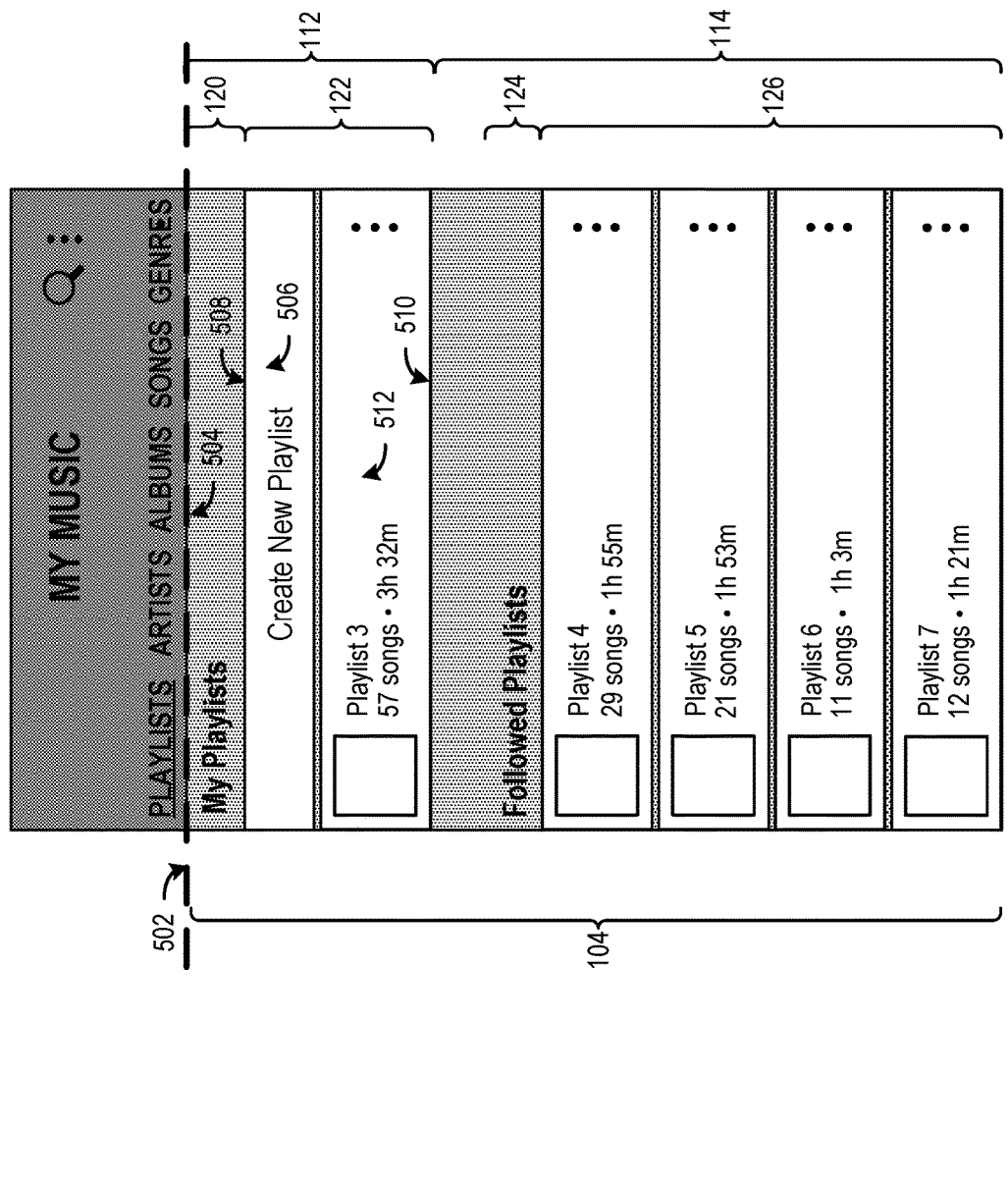
FIG. 5 is a schematic diagram illustrating a fifth example of a user interface for implementing aspects of a translucent user interface element, according to some embodiments.

FIG. 5 is a schematic diagram illustrating a fifth example of a user interface 500 for implementing aspects of a translucent user interface element, according to some embodiments. User interface 500 may be provided by an application operating on a user device. User interface 500 may be an example of the user interface 400 of FIG. 4 as the user interface elements within viewing area 104 have continued to be scrolled upward.

In at least one embodiment, as the user interface elements are scrolled upward, the section header element 120 may align with the top-most boundary (e.g., boundary 502) of the viewing area 104. That is a top-most boundary (e.g., boundary 504) may meet and/or align with the boundary 502 of the viewing area 104. In response to this alignment, the section header element 120 may be docked in the position depicted (e.g., at the top of the viewing area 104) and the background of section header element 120 may be changed from transparent to translucent as depicted in FIG. 6.

By docking the section header element 120 at the top of the viewing area 104, the section header element 120 may no longer be scrolled in response to user input. This may be the case until the bottom-most boundary 508 is aligned with the bottom-most boundary 510 the bottom-most section entry of the section entry element set 122 (e.g., the section entry element 512.

While the section header element 120 is docked, any remaining section header elements (e.g., the section header element 124) may be scrolled with the various section entry element sets within the viewing area 104.

Figure 6:
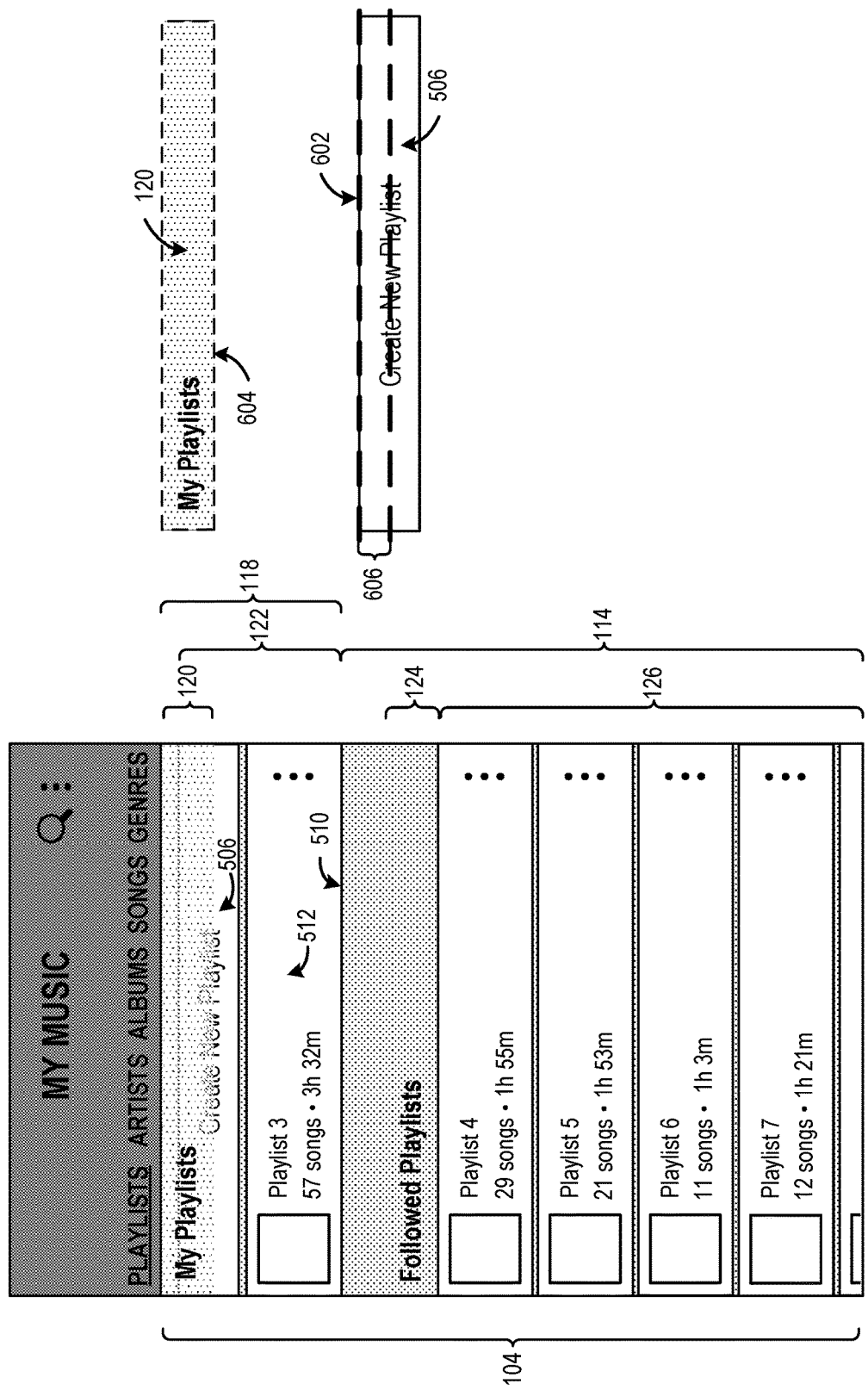
FIG. 6 is a schematic diagram illustrating a sixth example of a user interface for implementing aspects of a translucent user interface element, according to some embodiments.

FIG. 6 is a schematic diagram illustrating a sixth example of a user interface 600 for implementing aspects of a translucent user interface element, according to some embodiments. User interface 600 may be provided by an application operating on a user device. User interface 600 may be an example of the user interface 500 of FIG. 5 as the user interface elements within viewing area 104 have continued to be scrolled upward.

In some embodiments, upon determining that the section entry element 506 has traversed into the section header element 120 (e.g., a top-most boundary 602 of the section entry element 506 is aligned with or has passed the bottom-most boundary 604 of the section header element 120), the background of section header element 120 may be changed from transparent to translucent. Once translucent, at least some portion of the section entry element 506 may be viewed as if behind the section header element 120. In the example depicted in FIG. 6, as the scrolling action continues to cause the user interface elements within the viewing area 104 to be scrolled upward, the section header element 120 be overlaid over at least some portion (e.g., portion 606) of the section entry element 506 as depicted.

While the section header element 120 is docked and translucent, remaining section header element(s) (e.g., the section header element 124) and/or section entry element sets (e.g., section entry element sets 122 and/or 126) may be scrolled upward within the viewing area 104. While the section header element 120 has a translucent background, the backgrounds of the remaining section header elements (e.g., the section header element 124) may continue to appear transparent and/or in a manner consistent with a gradient background color. A displayed portion of the section header element 120 may remain consistent until the bottom-most boundary 604 aligns with the bottom-most boundary 510 of the section entry element 512. When the bottom-most boundary 604 aligns with the bottom-most boundary 510 of the section entry element 512, the section header element 120 and the section entry element 512 may be remain aligned as they are both scrolled upward until they are no longer visible within the viewing area 104.

In some embodiments, as the user interface elements are positioned as depicted in FIG. 6, additional user input may be received that causes the user interface elements within the viewing area 104 to be scrolled downward. When the section entry element 506 is scrolled far enough so that it no longer traverses the section header element 120 (e.g., the top-most boundary 602 once again crosses the bottom-most boundary 604 in a downward direction), the background of the section header element 120 may be changed from translucent to transparent. While the section header element 120 has a translucent background, the background of the section header element 124 may continue to appear transparent and/or may continue to appear consistent with respect to a gradient background color.

In some embodiments, were the user interface elements to continue scrolling upward from the positions depicted in FIG. 6, the section header element may be docked and its background changed from transparent to translucent if its top-most boundary was to align with the top-most boundary of the viewing area 104 in a similar manner as described above. While the section header element 124 is docked and translucent, the section entry element set 126 may be scrolled according to the user input received while the section header element 124 remained stationary (e.g., at the top of the viewing area 104).

FIG. 7A is a schematic diagram illustrating a gradient background 700A of a user interface, according to some embodiments. The gradient background 700A may include different shades of the same color and/or one or more shades of one or more different colors. By way of example, the gradient background 700A may include various shades of the color blue (or any suitable color(s)). In some embodiments, the gradient background 700A may include a focal point 702 at which a lightest shade of blue (or white) is depicted. From the focal point 702, the gradient background may become increasingly darker as the edge of the background is approached.

As a non-limiting example, the area defined by ellipse 704 may depict a first shade of blue (e.g., a lightest shade of blue). The area defined by ellipse 706 may depict a second shade of blue that is darker than the first shade of blue. The area 708 and the area 710 may depict a third shade of blue (e.g., a darkest shade of clue) that is darker than the second shade of blue. The gradient background 700A may be shaded according to any suitable number of areas of any suitable shape. A top-most point of the ellipse 704 may be a distance 712 from the top-most point of the ellipse 706. Similarly, the top-most point of the ellipse 706 may be a distance 714 from the top-most point of the ellipse 708. The distance 712 may be equal to the distance 714 or the distance 712 may be different than the distance 714. If a greater number of ellipses (or other suitable shapes are utilized) the distances between the areas may be the same or the distances may differ. For example, twenty areas defined by twenty ellipses may be utilized, the distance between the top-most points of each ellipses may be equal and relatively small. Utilizing a larger number of ellipses relatively close together may cause the gradient background 700A to appear to darken in a continuous manner from the focal point 702 to an area farthest away from the focal point 702

FIG. 7B is a schematic diagram illustrating the user interface of FIG. 1 as utilized with the gradient background of FIG. 7A, according to some embodiments. As illustrated, a focal point (e.g., corresponding to the focal point 702 of FIG. 7A) of the gradient background utilized in FIG. 7B may be located 716. The gradient background 700A may be visible within each of the user interface elements of FIG. 7B, or the gradient background 700A may be visible with a subset of the user interface elements of FIG. 7B.

As a non-limiting example, the gradient background 700A may be visible within the sections 110, 112, and 114 in all areas outside of the section entry elements of the section entry elements sets 118, 122, and 126. Although in some examples, the gradient background 700A may be visible within the section entry elements of the section entry element sets 118, 122, and 126 as well. By utilizing the gradient background, boundaries of various user interface elements may be apparent while the gradient background 700A may also be less jarring to view than a background that was solid and relatively bright.

Figure 8:
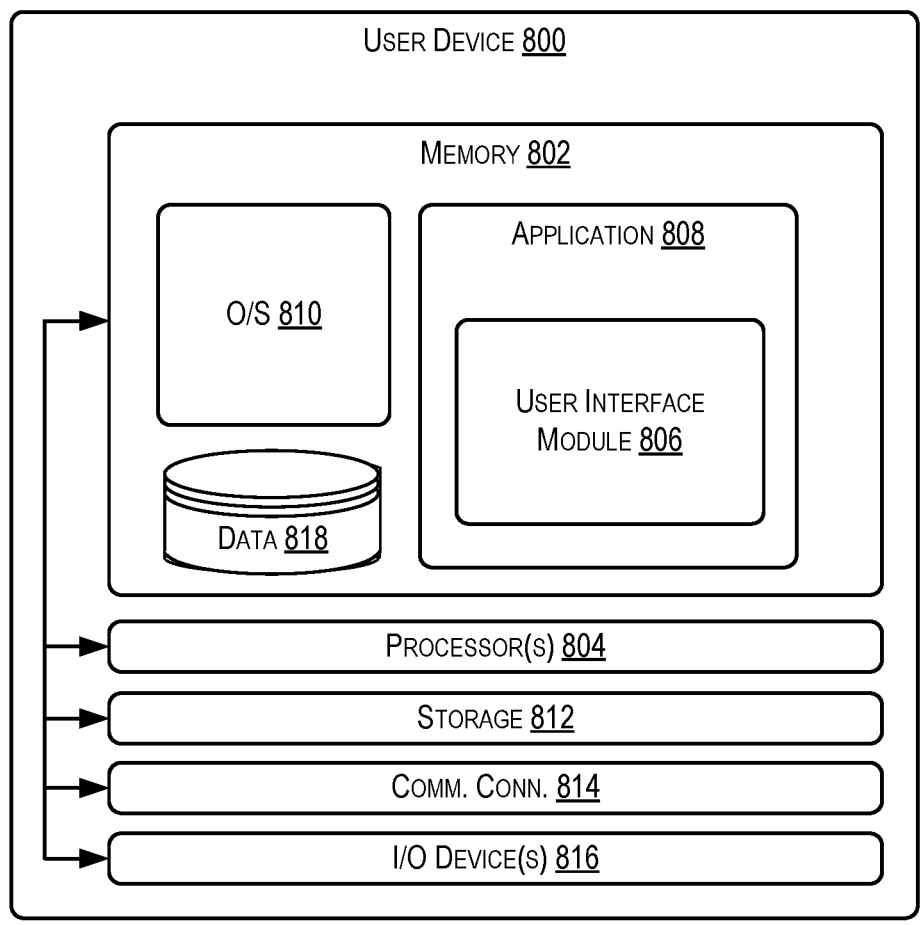
FIG. 8 illustrates in greater detail the components of user device, including a user interface module for implementing translucent user interface elements, in accordance with at least one embodiment.

FIG. 8 illustrates various components of a user device 800, including a user interface module 806 for implementing translucent user interface elements, in accordance with at least one embodiment. The user device 800 may be any suitable type of computing device such as, but not limited to, a mobile phone, a smartphone, a personal digital assistant (PDA), a laptop computer, a desktop computer, a thin-client device, a tablet PC, an electronic book (e-book) reader, etc.

In one illustrative configuration, the user device 800 may include at least one memory 802 and one or more processing units (or processor(s) 804). The processor(s) 804 may be implemented as appropriate in hardware, computer-executable instructions, firmware, or combinations thereof. Computer-executable instruction or firmware implementations of the processor(s) 804 may include computer-executable or machine-executable instructions written in any suitable programming language to perform the various functions described.

The memory 802 may store program instructions that are loadable and executable on the processor(s) 804, as well as data generated during the execution of these programs. The memory 802 may include an operating system, one or more data stores, and/or one or more application programs, modules, or services for implementing the features disclosed herein including one or more features of the user interface module 806 (e.g., a component of application 808). Depending on the configuration and type of user computing device, the memory 802 may be volatile (such as random access memory (RAM)) and/or non-volatile (such as read-only memory (ROM), flash memory, etc.). The user device 800 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 802 may include multiple different types of memory, such as static random access memory (SRAM), dynamic random access memory (DRAM), or ROM.

Turning to the contents of the memory 802 in more detail, the memory 802 may include an O/S 810 and one or more application programs, modules, or services for implementing the features disclosed herein, such as the application 808 (e.g., a music browsing application associated with a music service).

As described above, the application 808, operating on the user device 800 may allow the user to scroll through various sections of a user interface provided by the user interface module 806. The application 808 may be capable of handling requests from the user and serving, in response, various user interfaces that can be rendered at the user device 800. For example, the application 808 can present any suitable type of website and/or interface to enable the user to scroll through various sections of various user interfaces.

The memory 802 may store program instructions that are loadable and executable on the processor(s) 804, as well as data generated during the execution of these programs. Depending on the configuration and type of service provided by the user device 800, the memory 802 may be volatile (such as RAM) and/or non-volatile (such as ROM, flash memory, etc.). The user device 800 may also include additional storage (e.g., additional storage 812), which may include removable storage and/or non-removable storage. The additional storage 812 may include, but are not limited to, magnetic storage, optical disks and/or tape storage. The disk drives and their associated computer-readable media may provide non-volatile storage of computer-readable instructions, data structures, program modules, and other data. In some implementations, the memory 802 and/or the additional storage 812 may include multiple different types of memory, such as SRAM, DRAM, or ROM.

The memory 802 both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. Additional types of computer storage media that may be present in the user device 800 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the respective provider computers. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The user device 800 may also contain communications connection(s) 814. The communication connection 812 may allow the user device 800 to communicate with a stored database, another computing device or server, user terminals and/or other devices on one or more networks. The user device 800 may also include I/O device(s) 816. The I/O device(s) 816, may include devices such as a keyboard, a mouse, a pen, a voice input device, a touch input device, a display, speakers, a printer, etc.

As shown, the application 808 includes user interface module 806, although additional modules may be included within the application 808. The user interface module 806 may include any appropriate combination of hardware and/or software suitable to provide the described functionality.

In at least one embodiment, the user interface module 806 may be configured to cause the processor(s) 804 to provide one or more interfaces via the I/O devices 816 (e.g., the user interfaces 100-600 discussed above with respect to FIGS. 1-6. In some examples, any or all of the user interfaces 100-600 may utilize gradient background 700A of FIG. 7. Any features of the user interface module 806 discussed herein may be performed in any suitable order, any suitable number of times.

In some embodiments, the user interface module 806 of the application 808 may be configured to provide various interfaces with which a user may browse for data. By way of example, the application 808 may be a music application associated with a music service and the user interface module 806 may provide one or more interfaces for viewing data (e.g., playlists associated with a user account). The user interfaces provided (e.g., the user interfaces 100-600) may provide such data in a tabular and/or list format. In some examples, the user interface module 806 may provide within a section of a user interface one or more playlists that are related to one another and potentially labeled according to their relation. One or more section header elements (e.g., associated with a name/label) may be provided within a particular user interface. Each section header element may be presented as being at the top of a set of section entry elements. For example, a section header element that provides a label "Auto Playlists," may be presented by the user interface module 806 as being positioned above multiple section entry elements that each correspond to a specific playlist that has been automatically generated for the user.

Prior to receiving any user input, the user interface module 806 may initially present the each of the section header elements as having transparent backgrounds. The user interface module 806 may be configured to cause the processor(s) 804 to receive user input. In some examples, the user input may be received as a result of a touch gesture, selection and/or dragging of a scroll bar, or any suitable user input provided via the user interface. In some embodiments, the user input may indicate a scrolling action that causes at least some of the user interface elements of the user interface to be scrolled in an upward direction. Upon receiving such user input, the user interface module 806 may be configured to identify a top-most section header element and to determine that a top-most boundary of the top-most section header element is aligned with a top-most boundary of a viewing area (e.g., the viewing area 104 of FIG. 1) of the user interface. As a result of this determination, the user interface module 806 may cause the top-most section header element to be docked at a particular location of the user interface (e.g., the top of the viewing area 104). In some examples, the user interface module 806 may make this determination based at least in part on receiving information from the O/S 810 indicating that the top-most section header element is aligned with the top-most boundary of the viewing area 104.

As a result of the user input (or subsequent user input indicating additional scrolling action(s) in the upward direction), the user interface module 806 may be configured to determine that a top-most section entry element has traversed the top-most section header element of the user interface. Said another way, the user interface module 806 may determine when a top-most boundary of the top-most section entry element has aligned and/or passed a bottom-most boundary of the section header element.

When the top-most section entry element has traversed the top-most section header element, the user interface module 806 may be configured to cause a portion of the section header element (e.g., the background) to be changed from transparent to translucent. Once translucent, the section header element may appear to be overlaid on top of the top-most section entry element such that information of the top-most section entry element may be visible and appear to be behind the section header element. It should be appreciated that, in some embodiments, when a section header element is overlaid over a section entry element, information of the section entry element may appear darker and/or more obscured than information of the section header element. Thus, the user interface module 806 may cause the section header element information (e.g., text corresponding to a label of the corresponding section such as "Auto Playlists") to be clearly visible at the same time as the information of the top-most section entry element (e.g., a name of the playlist, a running time of the playlist, a number of songs associated with the playlist, etc.). If scrolling continues upward in accordance with the received user input, section header element may remain docked making it clear to the user what section he is currently viewing.

In some embodiments, reception of the user input (or subsequent user input) may cause user interface module 806 to scroll various user interface elements upward such that a bottom-most section entry element of a section becomes aligned with its section header element. That is, the bottom-most boundary of the bottom-most section entry element of the set may align with the bottom-most boundary of the section header element. Once aligned, the user interface module 806 may be configured to cause both the section header element and the bottom-most section entry element to be scrolled together upward and, eventually, off the viewing area of the user interface according to the received user input. In some embodiments, the user interface module 806 may be configured to determine new section header element that as situation at a top-most position within the viewing area 104.

If the upward scrolling action continues (or subsequent user input indicating an upward scrolling action is received), the user interface module 806 may be configured to determine when the new section header element meets the top of the viewing area 104. When the new section header element meets the top of the viewing area 104, the new section header element may be docked at that particular location. In some embodiments, the docking may be performed by the user interface module 806 while in other embodiments, the docking may occur as a function of the O/S 810.

As the upward scrolling action continues (or subsequent user input indicating an upward scrolling action is received), a top-most section entry element that was previously presented below the section header element may traverse into the section header element space. Upon determining that the top-most section entry element has traversed into the section header element (e.g., a space occupied by the section header element), the user interface module 806 may be configured to change the background of the section header element from transparent to translucent. Accordingly, the top-most section entry element (and potentially more of the section entry elements) may be visually presented as being behind the section header element such that the information of the section header element (e.g., a label such as "My Playlists") may be visible at the same time and within the same area as the information presented by the section entry elements (e.g., a name of the playlist, a running time of the playlist, a number of songs associated with the playlist, etc.).

In some situations, user input may be received by the user interface module 806 that indicates that causes the user interface elements of the user interface currently presented by the user interface module 806 are to be scrolled downward. The user interface module 806 may be configured to identify a top-most section header element that is visible within viewing area 104, to determine that the top-most section header element has one or more related section entry elements, and to determine that none of those section entry elements are currently traversing a top-most section header element. When the user interface module 806 determines that any or all of these conditions are met, the user interface module 806 may cause presentation of the section header element to be modified from a translucent background to a transparent background. If the user interface module 806 determines that a top-most section entry element is scrolled past a threshold distance from the section header element, the user interface module 806 (or the O/S 810) may cause the top-most section header element to be undocked from the top of the viewing area 104.

If the user input indicates that the scrolling action is to be continued downward (or additional user input is received that causes the section entry list to be scrolled further downward), a previously viewed section header element may once again become visible. For example, the user interface module 806 may cause an "Auto Playlist" section header element and bottom-most section entry element of the "Auto Playlist" section entry elements may once again become visible. The user interface module 806 may cause the section header element and the bottom-most section entry element to be scrolled downward together until the bottom of the section header element reaches a threshold distance from the top of the viewing area. In some embodiments, upon reaching the threshold distance the user interface module 806 (or the O/S 810) may cause the section header element to be docked once more to the top of the viewing area 104. The user interface module 806 may further be configured to cause the section entry element(s) to continue to be scrolled downward in accordance with received user input. The user interface module 806 may be configured to determine when the section entry elements corresponding to the docked section header element no longer traverse into the section header element. In response to such a determination, the user interface module 806 may be configured to modify the background of the section header element from translucent to transparent.

Figure 9:
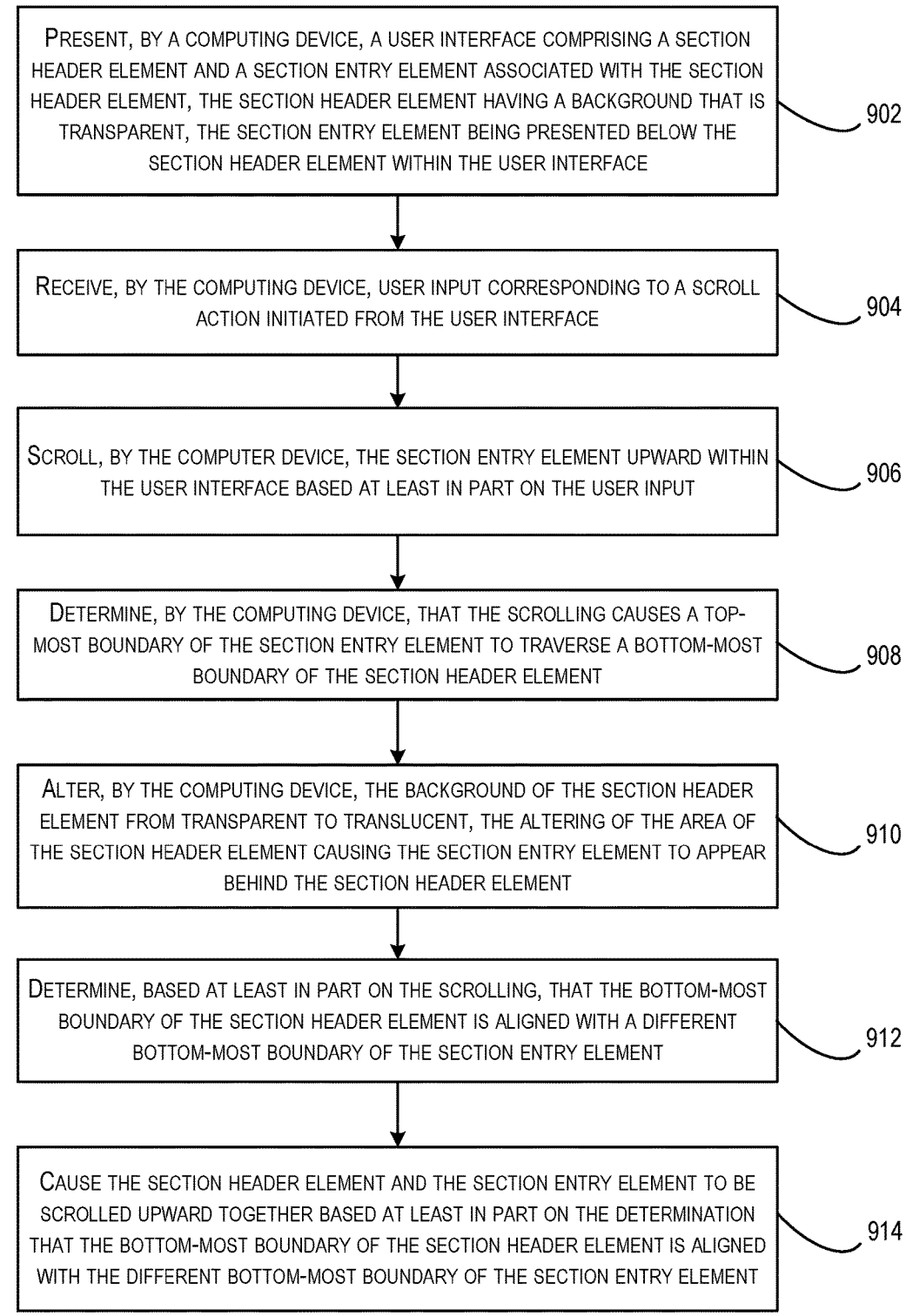
FIG. 9 is a flowchart illustrating an example method for utilizing translucent user interface elements (e.g., section header elements), in accordance with at least one embodiment.

FIG. 9 is a flowchart illustrating an example method 900 for utilizing translucent user interface elements (e.g., section header elements), in accordance with at least one embodiment. The method 900 may be performed by the user interface module 806 of FIG. 8. The method 900 may performed in any suitable order. It should be appreciated that the method 900 may include a greater number or a lesser number of steps than that depicted in FIG. 9.

The method may begin at 902, where a user interface (e.g., user interface 100 of FIG. 1) comprising a section header element (e.g., section header element 116 of FIG. 1) and a section entry element (e.g., the section entry element 128) associated with the section header element may be presented by a computing device (e.g., the user interface module 806 of the user device 800 of FIG. 8). In some embodiments, the section header element may have a background that is transparent. The section entry element (e.g., section entry element 128) may be presented below the section header element within the user interface.

At 904, user input corresponding to a scroll action initiated from the user interface may be received by the computing device (e.g., the user interface module 806). In some embodiments, the scroll action may indicate that the section entry element is to be scrolled upward.

At 906, the section entry element (e.g., the section entry 128 of FIG. 1) may be scrolled (e.g., the user interface module 806) upward within the user interface based at least in part on the user input. For example, the section entry 128 of FIG. 1 may be scrolled upward as depicted in FIG. 2.

At 908, the computing device (e.g., the user interface module 806) may determine that scrolling the section entry element upward causes a top-most boundary (e.g., top-most boundary 202 of FIG. 2) of the section entry element (e.g., the section entry element 128 of FIG. 2) to traverse a bottom-most boundary (e.g., bottom-most boundary 204 of FIG. 2) of the section header element (e.g., the section header element 116 of FIG. 2).

At 910, the computing device (e.g., the user interface module 806) may alter the background of the section header element (e.g., section header element 116 of FIG. 2) from transparent to translucent. FIG. 1 may depict the section header element 116 with a transparent background, while FIG. 2 may depict the section header element 116 with a translucent background. In some embodiments, altering of the area of the section header element may cause the section entry element to appear behind the section header element as depicted in FIG. 2.

At 912, it may be determined (e.g., by the user interface module 806), based at least in part on the scrolling, that the bottom-most boundary (e.g., bottom-most boundary 302 of FIG. 3) of the section header element (e.g., the section header element 116 of FIG. 3) is aligned with a different bottom-most boundary (e.g., bottom-most boundary 304 of FIG. 3) of the section entry element. (e.g., the section entry element 132 of FIG. 3).

At 914, the computing device (e.g., the user interface module 806) may cause the section header element (e.g., the section header element 116 of FIG. 4) and the section entry element (e.g., the section entry element 132 of FIG. 4) to be scrolled upward together. The section header element and the section entry element may be scrolled upward together based at least in part on the determination that the bottom-most boundary of the section header element is aligned with the different bottom-most boundary of the section entry element.

Figure 10:
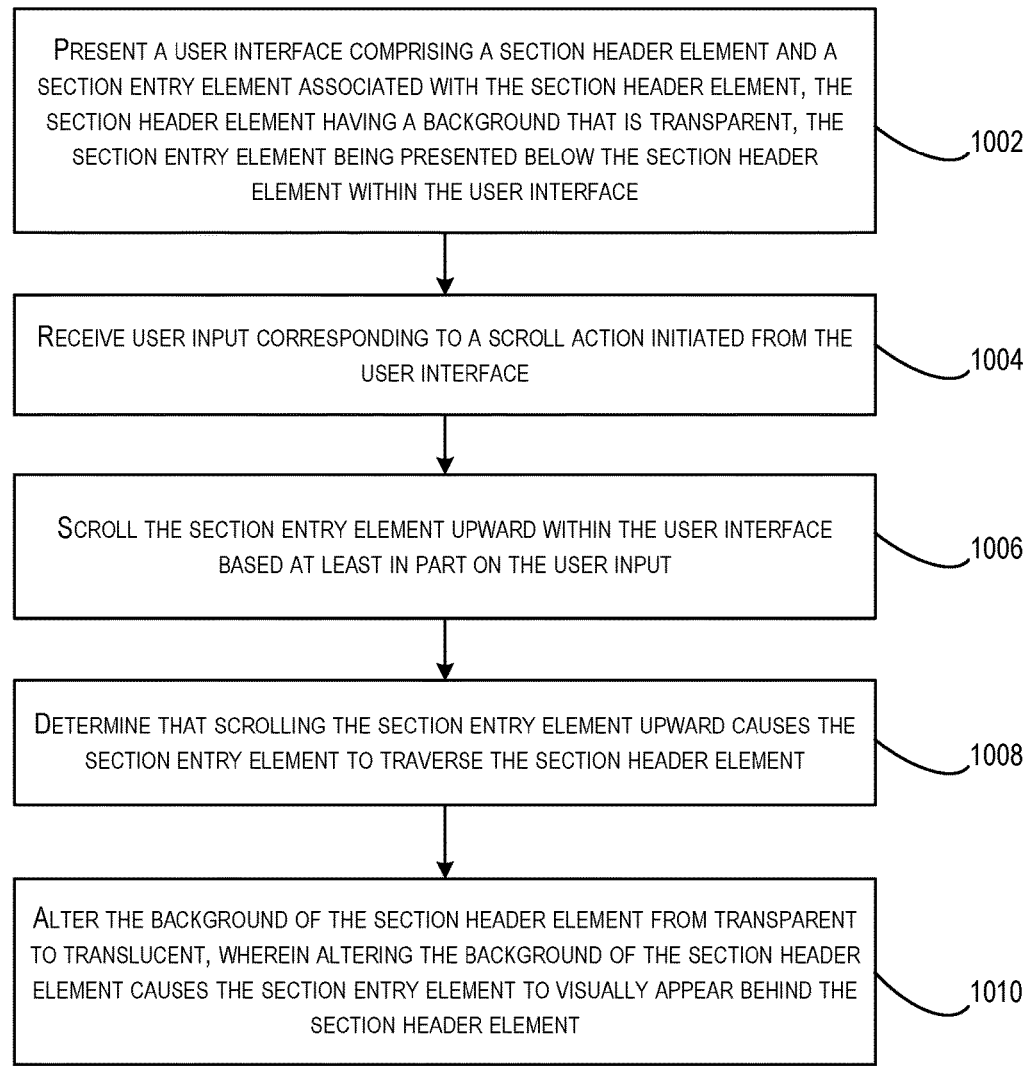
FIG. 10 is a flowchart illustrating another example method for utilizing translucent user interface elements (e.g., section header elements), in accordance with at least one embodiment.

FIG. 10 is a flowchart illustrating another example method 1000 for utilizing translucent user interface elements (e.g., section header elements), in accordance with at least one embodiment. The method 1000 may be performed by computing device (e.g., the user interface module 806 of the user device 800 of FIG. 8. The user device may comprise a processor, a display device, and a memory storing computer-readable instructions that, upon execution by the processor, cause the processor to perform the operations of method 1000. The method 1000 may performed in any suitable order. It should be appreciated that the method 1000 may include a greater number or a lesser number of steps than that depicted in FIG. 10.

The method may begin at 1002, where a user interface (e.g., user interface 100 of FIG. 1) comprising a section header element (e.g., section header element 116) and a section entry element (e.g., section entry element 128) associated with the section header element may be presented. In some embodiments, the section header element may have a background that is transparent. The section entry element being presented below the section header element within the user interface as depicted in, for example, FIG. 1.

At 1004, user input corresponding to a scroll action initiated from the user interface may be received. By way of example, the user input may indicate that one or more user interface elements (e.g., one or more section header elements and/or one or more section entry elements/element sets) should be scrolled upward.

At 1006, the section entry element may be scrolled upward within the user interface based at least in part on the user input. By way of example, in response to user input utilizing user interface 100, the section entry element 128 of FIG. 1 may be scrolled such that a top-most boundary of the section entry element 128 may traverse (e.g., meet and/or pass) a bottom-most boundary of the section header element 116 of FIG. 1.

At 1008, it may be determined (e.g., by the user interface module 806 of FIG. 8) that the scrolling causes the section entry element to traverse the section header element. That is, the top-most boundary of the section entry element 128 meets or passes a bottom-most boundary of the section header element 116 of FIG. 1.

At 1008, the background of the section header element may be altered from transparent to translucent. In some embodiments, altering the background of the section header element may cause the section entry element to visually appear behind the section header element (See, section entry element 128 of FIG. 2).

Figure 11:
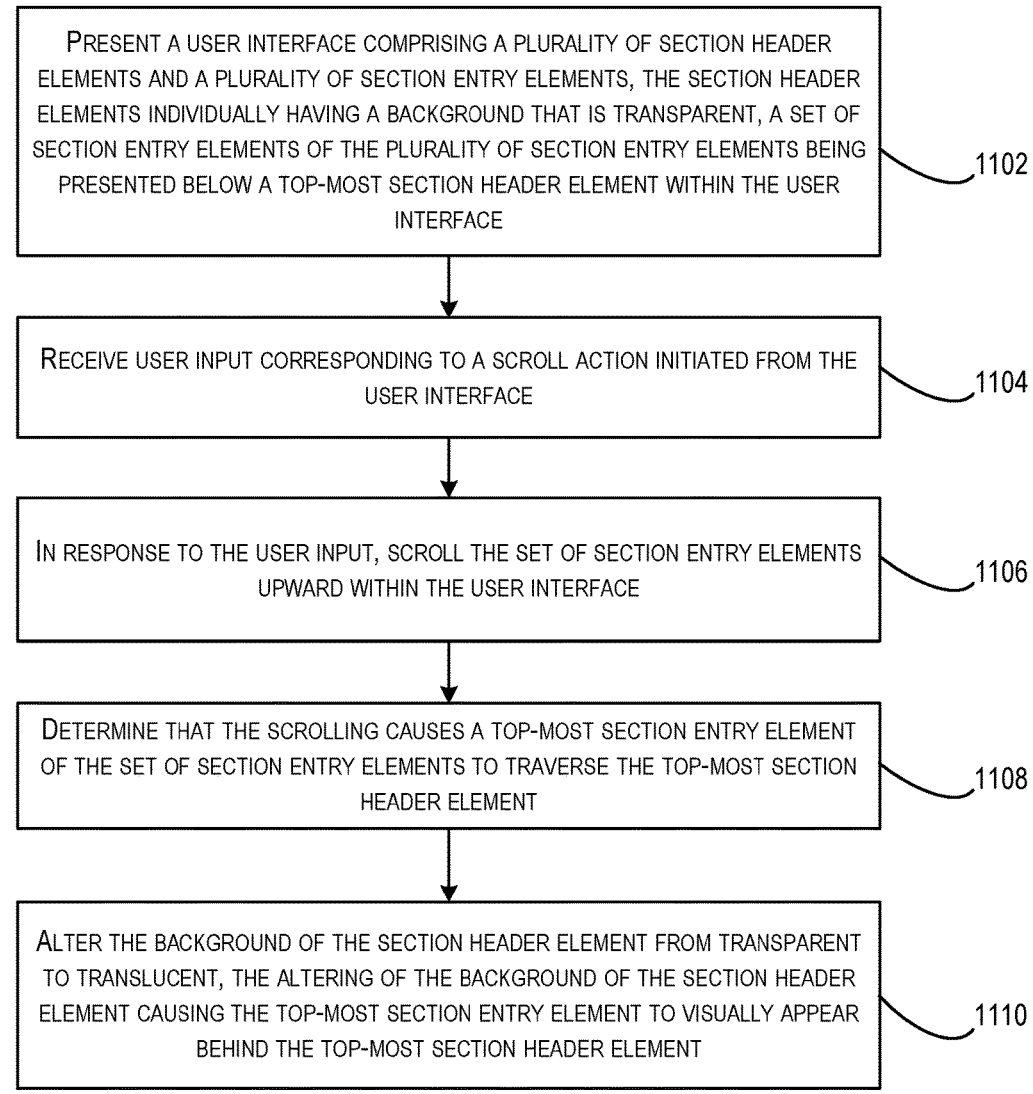
FIG. 11 is a flowchart illustrating yet another example method for utilizing translucent user interface elements (e.g., section header elements), in accordance with at least one embodiment.

FIG. 11 is a flowchart illustrating yet another example method for utilizing translucent user interface elements (e.g., section header elements), in accordance with at least one embodiment. A computer-readable storage medium may comprise computer-readable instructions that, upon execution by a computing device, configure the computing device (e.g., the user device 800 of FIG. 8) to perform the operations of method 1100. The method 1100 may be performed by the user interface module 806 of FIG. 8. The method 1100 may performed in any suitable order. It should be appreciated that the method 1100 may include a greater number or a lesser number of steps than that depicted in FIG. 11.

The method may begin at 1102, where a user interface comprising a plurality of section header elements and a plurality of section entry elements may be presented. In some embodiments, the section header elements may individually have a background that is transparent. A set of section entry elements of the plurality of section entry elements may be presented below a top-most section header element within the user interface as depicted in FIG. 1.

At 1104, user input corresponding to a scroll action initiated from the user interface may be received. The scroll action may indicate that one or more section header elements and/or one or more section entry elements are to be scrolled upward.

At 1106, in response to the user input, the set of section entry elements may be scrolled upward within the user interface as depicted in FIG. 2.

At 1108, it may be determined (e.g., by the user interface module 806 of FIG. 8) that the scrolling causes a top-most section entry element of the set of section entry elements to traverse the top-most section header element. That is the top-most boundary of the top-most section entry element meets or passes the bottom-most boundary of the top-most section header element.

At 1110, the background of the section header element may be altered from transparent to translucent. In some embodiments, altering the background of the section header element may cause the top-most section entry element to visually appear behind the top-most section header element.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   presenting, by a computing device, a user interface comprising a section header element and a section entry element associated with the section header element, the section header element having a background that is transparent, the section entry element being presented below the section header element within the user interface;
   receiving, by the computing device, user input corresponding to a scroll action initiated from the user interface;
   scrolling, by the computing device, the section entry element upward within the user interface based at least in part on the user input;
   determining, by the computing device, that the scrolling causes a top-most boundary of the section entry element to traverse a bottom-most boundary of the section header element;
   altering, by the computing device, the background of the section header element from transparent to translucent, the altering of the background of the section header element causing the section entry element to appear behind the section header element;
   determining, based at least in part on the scrolling, that the bottom-most boundary of the section header element is aligned with a different bottom-most boundary of the section entry element; and
   causing the section header element and the section entry element to be scrolled upward together based at least in part on the determination that the bottom-most boundary of the section header element is aligned with the different bottom-most boundary of the section entry element.

2. The computer-implemented method of claim 1, wherein the section header element is docked at a particular location of the user interface, and wherein the section header element remains docked at the particular location of the user interface while the section entry element is scrolled upward until the bottom-most boundary of the section header element is determined to be aligned with the different bottom-most boundary of the section entry element.

3. The computer-implemented method of claim 2, wherein the user interface comprises an additional section header element, the additional section header element being presented below the section header element, wherein the method further comprises:
   determining, based at least in part on the scrolling, the additional section header element is located at the particular location of the user interface; and
   docking the additional section header element at the particular location of the user interface.

4. The computer-implemented method of claim 1, further comprising:

receiving, by the computing device, subsequent user input indicating a subsequent scroll action;

in response to the subsequent user input, scrolling the section entry element downward within the user interface;

determining that the section entry element no longer traverses the section header element; and altering, by the computing device, the background of the section header element from translucent to transparent.

5. A client device, comprising:

a processor;

a display device; and a memory storing computer-readable instructions that, upon execution by the processor, cause the processor to:

present, via the display device, a user interface comprising a section header element and a section entry element associated with the section header element, the section header element having a background that is transparent, the section entry element being presented below the section header element within the user interface;

receive user input corresponding to a scroll action initiated from the user interface;

scroll the section entry element upward within the user interface based at least in part on the user input;

determine that scrolling the section entry element upward causes the section entry element to traverse the section header element;

alter the background of the section header element from transparent to translucent, wherein altering the background of the section header element causes the section entry element to visually appear behind the section header element.

6. The client device of claim 5, wherein the section header element comprises first text, and the section entry element comprises second text, and wherein the altering of the background of the section header element from transparent to translucent causes the first text to be displayed over the second text.

7. The client device of claim 6, wherein the second text of the section entry element is presented as being darker then the first text while the section entry element visually appears to be behind the section header element.

8. The client device of claim 6, wherein the second text may be clearly viewed while visually appearing behind the section header element.

9. The client device of claim 5, wherein the user interface further comprises an additional section entry element corresponding to the section header element, the additional section entry element being presented below the section entry element.

10. The client device of claim 5, wherein the memory stores further computer-readable instructions that, upon execution by the processor, cause the processor to:

scroll upward within the user interface based at least in part on the user input, wherein altering of the background of the section header element from transparent to translucent further causes the section entry element and an additional section entry element to visually appear behind the section header element.

11. The client device of claim 10, wherein the memory stores further computer-readable instructions that, upon execution by the processor, cause the processor to:

determine that the additional section entry element is a bottom-most entry of a plurality of section entry elements corresponding with the section header element;

determine that a first bottom-most boundary of the section header element is aligned with a second bottom-most boundary of the additional section entry element; and cause the section header element and the additional section entry element to be scrolled upward together based at least in part on the user input and a determination that the first bottom-most boundary of the section header element is aligned with the second bottom-most boundary of the additional section entry element.

12. A computer-readable storage medium comprising computer-readable instructions that, upon execution by a computing device, configure the computing device to perform operations comprising:

presenting a user interface comprising a plurality of section header elements and a plurality of section entry elements, the plurality of section header elements individually having a background that is transparent, a set of section entry elements of the plurality of section entry elements being presented below a top-most section header element within the user interface;

receiving user input corresponding to a scroll action initiated from the user interface;

in response to the user input, scrolling the set of section entry elements upward within the user interface;

determining that the scrolling causes a top-most section entry element of the set of section entry elements to traverse the top-most section header element;

altering the background of the top-most section header element from transparent to transparent, the altering of the background of the top-most section header element causing the top-most section entry element to visually appear behind the top-most section header element.

13. The computer-readable storage medium of claim 12, comprising further instructions that configure the computing device to perform operations comprising scrolling additional section header elements of the plurality of section header elements based at least in part on the user input, wherein the top-most section header element remains stationary in response to the user input.

14. The computer-readable storage medium of claim 13, comprising further instructions that configure the computing device to perform operations comprising:

determining that the top-most section header element is aligned with a bottom-most section entry element of the set of section entry elements;

scrolling the top-most section header element and the bottom-most section entry element together;

scrolling a second section header element to a particular location of the user interface; and docking the second section header element to the particular location.

15. The computer-readable storage medium of claim 14, wherein determining that the top-most section header element is aligned with a bottom-most entry of the set of section entry elements is based at least in part on a subsequent user input initiated from the user interface.

16. The computer-readable storage medium of claim 12, comprising further instructions that configure the computing device to perform operations comprising:

receiving, utilizing the user interface, subsequent user input indicating a subsequent scroll action;

in response to the subsequent user input, scrolling the set of section entry elements downward within the user interface;

determining that none of the set of section entry elements traverse the top-most section header element; and altering, by the computing device, the background of the top-most section header element from translucent to transparent.

17. The computer-readable storage medium of claim 12, wherein the top-most section header element comprises first textual data.

18. The computer-readable storage medium of claim 17, wherein the top-most section entry element comprises second textual data, the second textual data being visible with the first textual data based at least in part on the scroll action.

19. The computer-readable storage medium of claim 17, wherein the top-most section entry element comprises graphical data, the graphical data being visible with the first textual data based at least in part on the scroll action.

20. The computer-readable storage medium of claim 12, wherein the user interface comprises a gradient background color, and wherein respective backgrounds of the plurality of section header elements are presented according to the gradient background color.

\* \* \* \* \*